(12) United States Patent
Meine

(10) Patent No.: US 9,985,577 B2
(45) Date of Patent: May 29, 2018

(54) ASSEMBLY FOR LOCKING AND GROUNDING SOLAR PANEL MODULES TO MOUNTING COMPONENTS

(71) Applicant: Ironridge, Inc., Hayward, CA (US)

(72) Inventor: Shawn Meine, Phoenix, AZ (US)

(73) Assignee: Ironridge, Inc., Hayward, CA (US)

( * ) Notice: Subject to any disclaimer, the term of this patent is extended or adjusted under 35 U.S.C. 154(b) by 0 days. days.

(21) Appl. No.: 15/008,070

(22) Filed: Jan. 27, 2016

(65) Prior Publication Data
US 2016/0218661 A1 Jul. 28, 2016

Related U.S. Application Data

(60) Provisional application No. 62/108,093, filed on Jan. 27, 2015.

(51) Int. Cl.
*E04B 1/00* (2006.01)
*H02S 20/23* (2014.01)
*F24J 2/52* (2006.01)

(52) U.S. Cl.
CPC ............. *H02S 20/23* (2014.12); *F24J 2/5245* (2013.01); *F24J 2/5252* (2013.01); *F24J 2/5256* (2013.01); *F24J 2002/5284* (2013.01); *F24J 2002/5294* (2013.01); *Y02B 10/12* (2013.01); *Y02B 10/20* (2013.01); *Y02E 10/47* (2013.01)

(58) Field of Classification Search
CPC ....... H02S 20/23; H02S 40/36; H01L 31/042; H01R 4/26; H01R 4/66

USPC ................................ 52/173.3; 136/244, 251
See application file for complete search history.

(56) References Cited

U.S. PATENT DOCUMENTS

| | | | | |
|---|---|---|---|---|
| 5,571,338 A | * | 11/1996 | Kadonome | ........... E04D 3/3608 136/251 |
| 6,105,317 A | * | 8/2000 | Tomiuchi | .................. E04D 3/08 52/173.3 |
| 6,370,828 B1 | | 4/2002 | Genschorek | |
| 6,591,557 B1 | * | 7/2003 | Thomsen | .................. E04D 3/08 49/71 |
| 7,435,134 B2 | * | 10/2008 | Lenox | .................... F24J 2/5245 439/567 |
| 7,780,472 B2 | * | 8/2010 | Lenox | .................... F24J 2/5211 136/251 |
| 7,866,099 B2 | * | 1/2011 | Komamine | ............ F24J 2/5207 24/290 |
| 8,424,255 B2 | | 4/2013 | Lenox et al. | |
| 8,443,558 B2 | * | 5/2013 | Buller | .................... F24J 2/5232 52/173.3 |
| 8,464,478 B2 | * | 6/2013 | Tweedie | ................. F24J 2/5203 52/173.3 |
| 8,567,134 B1 | | 10/2013 | Grushkowitz et al. | |
| 8,590,223 B2 | * | 11/2013 | Kilgore | ................. F24J 2/5256 136/244 |

(Continued)

*Primary Examiner* — Kimberly T Wood
(74) *Attorney, Agent, or Firm* — Law Office of Lance C. Venable, PLLC; Lance C. Venable

(57) ABSTRACT

In various representative aspects, an assembly for securing array skirts and solar panel modules in an array on a roof by utilizing semi-rigid and resilient spring tabs as locking mechanisms that both secure the solar panel modules to mounting plates and splices as well as provide a grounding path between the solar panel modules and the entire array. A method of installation of the assembly is also provided.

21 Claims, 13 Drawing Sheets

(56) References Cited

U.S. PATENT DOCUMENTS

| | | | | |
|---|---|---|---|---|
| 8,650,812 | B2* | 2/2014 | Cusson | F24J 2/465 126/621 |
| 8,683,761 | B2* | 4/2014 | Danning | H02S 20/23 136/251 |
| 8,713,881 | B2 | 5/2014 | DuPont | |
| 8,857,113 | B2 | 10/2014 | Zhang | |
| 8,875,453 | B2* | 11/2014 | Kanczuzewski | F16M 13/02 136/244 |
| 8,919,075 | B2 | 12/2014 | Erickson | |
| 8,938,932 | B1* | 1/2015 | Wentworth | H02S 20/23 52/173.3 |
| 9,249,925 | B2* | 2/2016 | Roensch | H01L 31/042 |
| 2003/0070368 | A1* | 4/2003 | Shingleton | F24J 2/5205 52/173.3 |
| 2006/0156651 | A1* | 7/2006 | Genschorek | F24J 2/045 52/200 |
| 2009/0114270 | A1 | 5/2009 | Stancel | |
| 2010/0276558 | A1* | 11/2010 | Faust | F24J 2/5205 248/222.14 |
| 2011/0108083 | A1* | 5/2011 | Ravestein | F24J 2/5237 136/244 |
| 2011/0203637 | A1 | 8/2011 | Patton et al. | |
| 2012/0102854 | A1 | 5/2012 | Meier et al. | |
| 2012/0260977 | A1 | 10/2012 | Stancel | |
| 2013/0192150 | A1* | 8/2013 | DuPont | F24J 2/5203 52/173.3 |
| 2013/0240008 | A1 | 9/2013 | Baket | |
| 2014/0010616 | A1* | 1/2014 | Meine | F16B 2/12 411/190 |
| 2014/0169870 | A1 | 6/2014 | Pressler et al. | |
| 2014/0175244 | A1* | 6/2014 | West | F24J 2/5205 248/316.7 |
| 2015/0311606 | A1* | 10/2015 | Meine | F16B 2/12 439/100 |
| 2016/0111835 | A1* | 4/2016 | Nayar | H01R 25/142 439/122 |
| 2016/0134230 | A1* | 5/2016 | Meine | H02S 20/23 52/698 |

* cited by examiner

ASSEMBLY FOR LOCKING AND GROUNDING SOLAR PANEL MODULES TO MOUNTING COMPONENTS

BACKGROUND OF INVENTION

Field of the Invention

The present invention relates generally to components used to install arrays of solar panels on residential roofs. More specifically, this invention relates to the use of a locking mechanism for securing and grounding an array of solar panels modules during the installation process in a rail-less guide system, such as a spring lock that fixes solar panels to a mounting element.

Description of the Related Art

Any discussion of the prior art in the specification should in no way be considered as an admission that the prior art is widely known or forms part of common general knowledge in the field.

The installation of solar panel arrays on residential roofs can be arduous and time-consuming. Depending on the array design, the components required to install the array can make the installation process even more difficult. Many of the assembly components require special tools or are generally difficult to install because they are utilized after the solar panels modules are arranged or positioned on their support elements. This is particularly true when the support elements are discrete components in a rail-less configuration. An installer must subsequently secure each solar panel module to the support element and this is often difficult to do using by hand if additional tools are required. Additionally, the solar panel modules should be electrically grounded to the support elements so the entire array is electrically connected. It is desirable to provide a simple component structure in a rail-less solar panel array configuration that allows an installer to easily arrange and lock the solar panel modules to their support elements, while electrically grounding the modules to those same elements in the array and without using additional or complicated tools.

In a typical rail-less guide system, a series of solar panel modules are inserted into a mount along the outer edges of the panels. In the present invention, each individual mount includes spring locks (also referred as spring tabs) with grounding features that are used to secure the solar panel modules to the mounts. The spring locks are semi-rigid generally rectangular-shaped tabs that are fixed on one end to an elevated portion on the mount, while the other end of the tab extends outward from the fixed position. The solar panel modules are secured by inserting the modules at an acute angle so that a portion of the module is inserted into a lip along the outer edge of the mount while module is then rotated downward so that the side of the module presses against the semi-rigid tabs and locks into a place. This is typically done by utilizing the resiliency in the spring lock tab to resist the force exerted on the side of the module and push outward against the side to allow the module to be inserted and secured within the lip. Additionally, as the spring lock pushes back on the side of the module, a raised portion on the outer edge of the tab penetrates an oxidation layer on the module, which allows the module to be electrically grounded to the mount. Each mount is secured to a series of flashings that are arranged in an array on a typical residential roof. One exemplary application of the assembly and installation method is described below.

Existing solutions are either unsatisfying in providing a way to secure solar panel arrays to rail-less guides or are too complicated to manufacture or install. Ideally, a system that allows installers to quickly and effectively secure solar panels to the mounts with minimal effort is desirable. For example, U.S. Pat. No. 8,919,075 teaches a solar panel module array that includes a mechanism that secures a module to a supporting portion of the frame on the outside of the solar module. The mechanism uses a pair of "fins" that are capable of contacting the edges of adjacent solar panel modules that allow for expansion and contraction of the modules. But this system is not utilized in combination with a rail-less system with resilient or rigid spring tabs that secure the solar panels on the mounts in combination with a grounding element for electrically grounding the solar panel module to the mount. This system also shows no use in combination with a pivoting support system or with splices that can be used to complete the solar panel array arrangement. The present invention overcomes these limitations and provides a solution that is both easy to, install, use, and manufacture.

SUMMARY OF THE INVENTION

The invention is summarized below only for purposes of introducing embodiments of the invention. The ultimate scope of the invention is to be limited only to the claims that follow the specification.

It is an object of this invention to provide an assembly for installing an array of solar panel modules on a residential roof.

It is a further object of this invention that the assembly use individual support mounts or mounting plates for the solar panel modules instead of an elongated rail.

It is a further object of this invention that the assembly includes a type of individual support mount that is pivotable when secured to a flashing.

It is a further object of this invention that the assembly includes a type of individual support mount that is a splice for joining at least two solar panel modules together.

It is a further object of this invention that the support mounts include at least one locking mechanism that is a spring tab.

It is a further object of this invention that the spring tab includes a raised portion for penetrating an oxidation layer of a solar panel module to effectuate grounding the solar panel module to the support mount.

It is a further object of this invention that the spring tab is semi-rigid or resilient.

It is a further object of this invention that the spring tab, when deflected from an open to a locked position, secures a solar panel module to the support mount while the raised portion of the spring tab penetrates an oxidation layer of the solar panel module.

It is a further object of this invention to provide a method of assembling a solar panel array utilizing the components described below.

A person with ordinary skill in the relevant art would know that any shape or size of the elements described below may be adopted as long as the assembly can be used to secure solar panel modules to the mounting elements and provide a grounding path from the modules to the mounting elements. Any combinations of suitable number, shape, and size of the elements described below may be used. Also, any materials suitable to achieve the object of the current invention may be chosen as well.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

DETAILED DESCRIPTION OF THE INVENTION

In the following description, and for the purposes of explanation, numerous specific details are provided to thoroughly understand the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed embodiments may be applied. The full scope of the invention is not limited to the example(s) that are described below.

Figure 1:
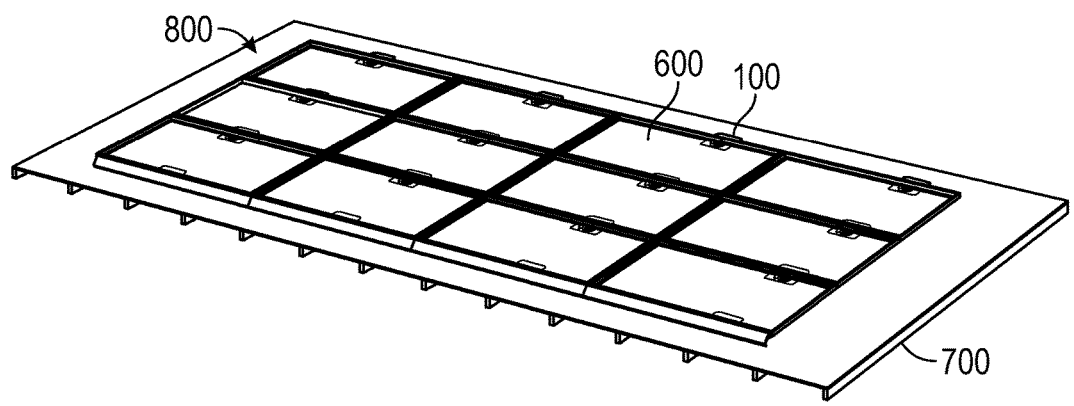
FIG. 1 illustrates a perspective view of a fully assembled solar panel array on a roof.
Figure 2:
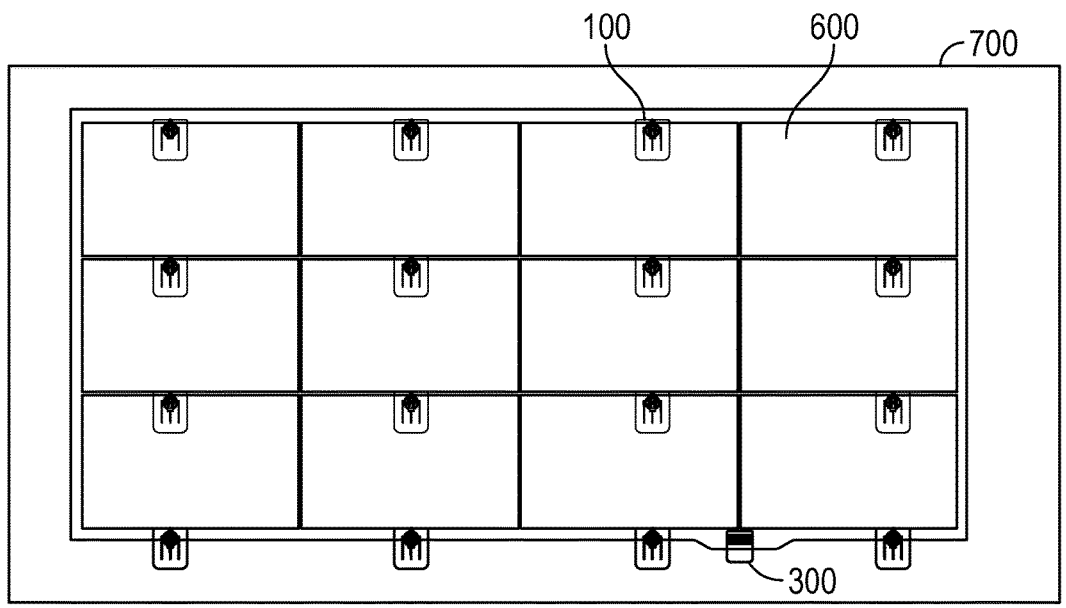
FIG. 2 illustrates a transparent top view of the same view shown in FIG. 1.
Figure 3:
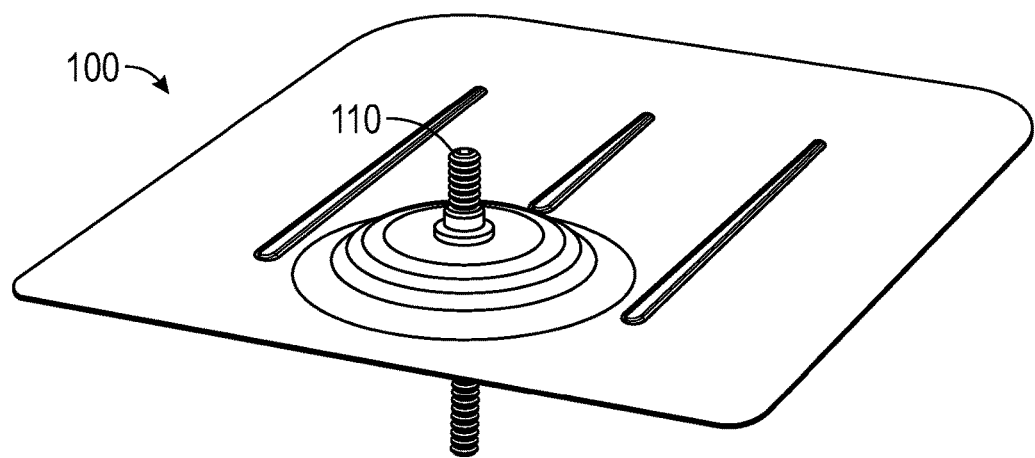
FIG. 3 shows a perspective view of a flashing apparatus.
Figure 4:
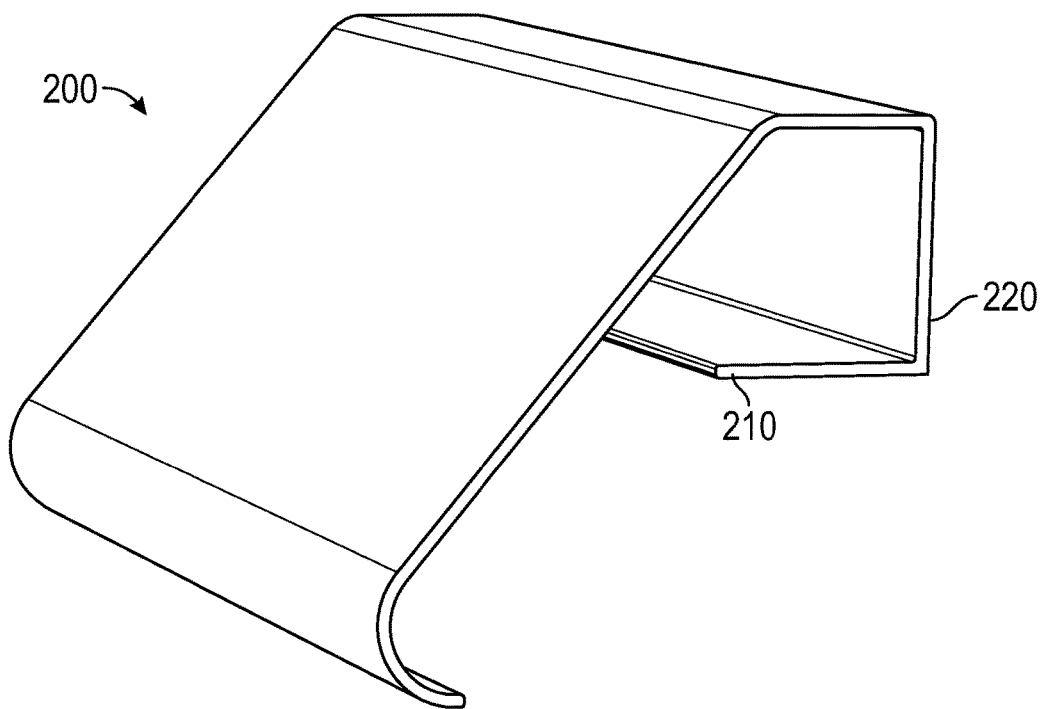
FIG. 4 illustrates a perspective view of an array skirt.

FIGS. 1 and 2 show a perspective and top view of a completed assembly of an exemplary solar panel array 800 as installed on a roof 700, and includes solar panel modules 600, array skirts 200, and flashings 100 that support several mounting plates that will be described later. FIG. 3 shows an exemplary flashing 100 that includes a securing bolt 110, but it can be of any suitable shape as long as it is capable of providing structural support to the array 800. A typical array skirt 200 is shown in FIG. 4. A typical array skirt includes an extension plate 200 and a rear back 220. In the array, the array skirts 200 are typically located on the perimeter of the array, while rows of modules 600 can be installed back-to-back on a given roof. A typical solar panel module 600 has four sides and the exemplary module 600 also includes an extension plate 610 that is typically perpendicular to at least one of the sides.

Figure 5:
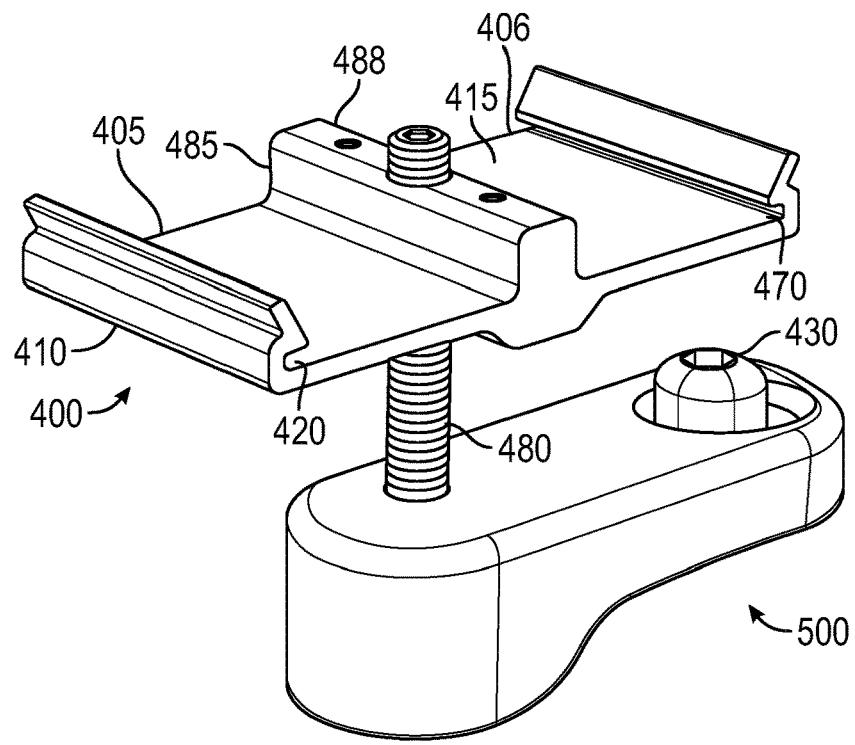
FIG. 5 illustrates the same mounting plate and pivot mount shown in FIG. 7 without the spring tabs installed.
Figure 12:
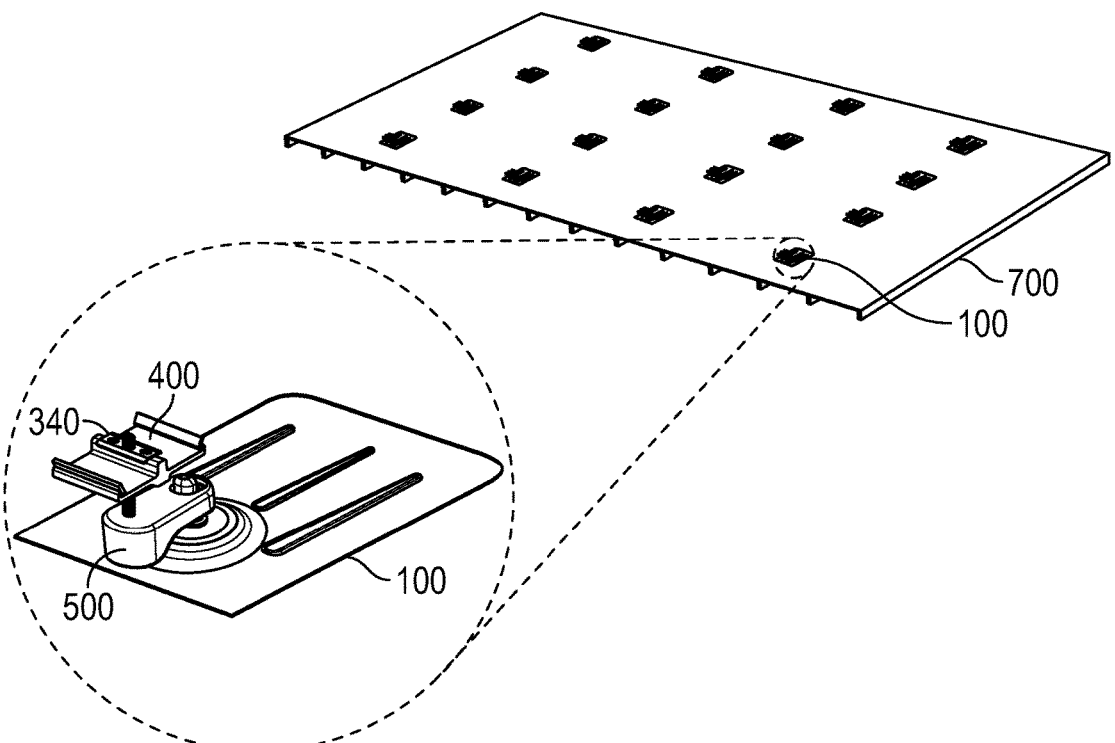
FIG. 12 illustrates the same assembly in FIG. 6 showing an exploded perspective view of a fully assembled mounting plate coupled to the flashing.

The assembly comprises several primary components. FIG. 5 shows an exemplary mounting plate 400. The mounting plate 400 can support both a solar panel module 600 and an array skirt 200. In the first row of the array as shown in FIG. 1, an array skirt 200 is typically installed on a first section 405 and a module 600 is installed on a second section 406 of the mounting plate 400. In subsequent rows, modules 600 are installed back-to-back in the mounting plate 400. The mounting plate 400 includes a base area 415 and two a pair of lips 410 with inlets 420 and 470 for receiving the bottom extension plates 610 of the modules 600 and array skirts 200. The shape of a lip 410 is typically a j-shape with the inlets 420 or 470 consisting of the opening of hook on the j-shape so that an extension plate 610 can snuggly fit within the inlets 420 or 470. A central base 485 is typically used to secure a spring tab 340 (shown in FIG. 6) at 488. The central base 485 is typically elevated above the base area 415 to provide room for the spring tabs 340 to bend downward and separates the first section 405 and second section 406 of the mounting plate 400. A typical mounting plate 400 is supported at the central base 485 by a pivot base 500 that includes a threaded bolt 480. The pivot base 500 can be of varying shape and is typically pivotally connected to the flashing 100. The height of the mounting plate 400 can be adjusted by rotating it around the bolt 480. The pivot base 500 is secured to a flashing 100 as shown in FIG. 12 and can also be fully rotated.

Figure 6:
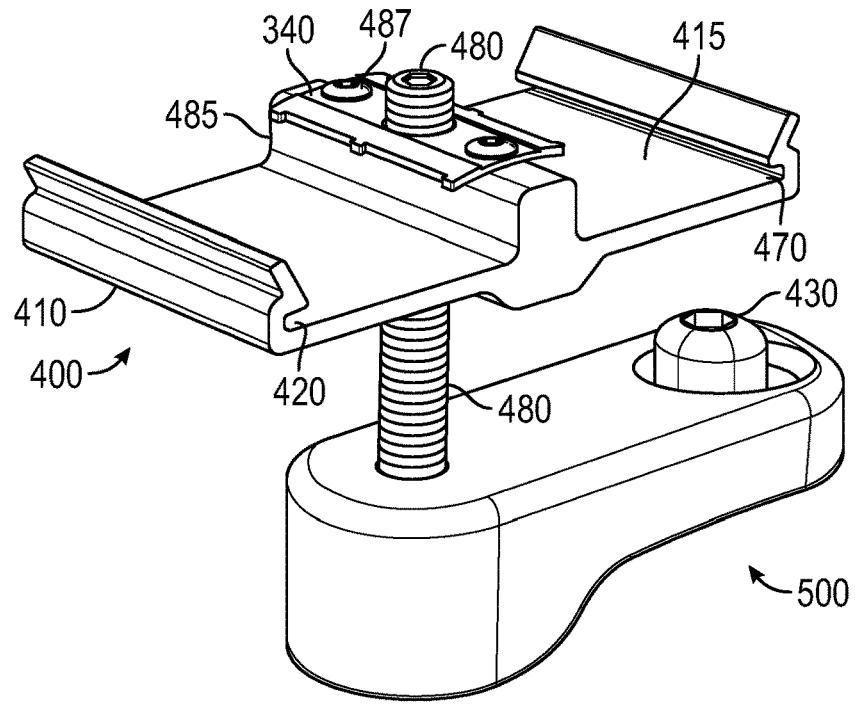
FIG. 6 illustrates a perspective view of an exemplary mounting plate and pivot mount assembly with spring tabs secured to the mounting plate.
Figure 7:
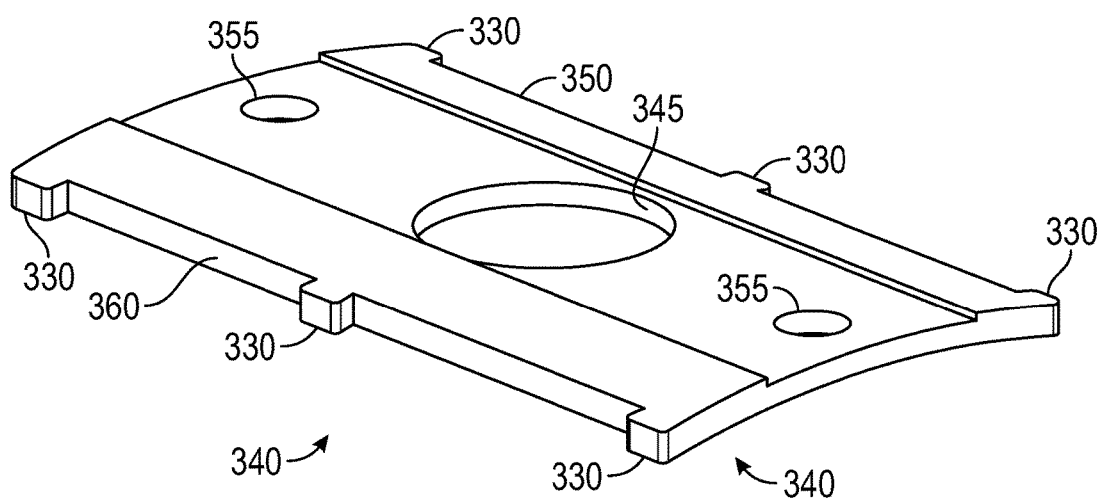
FIG. 7 illustrates a perspective view of an exemplary embodiment of a spring tab.
Figure 8:
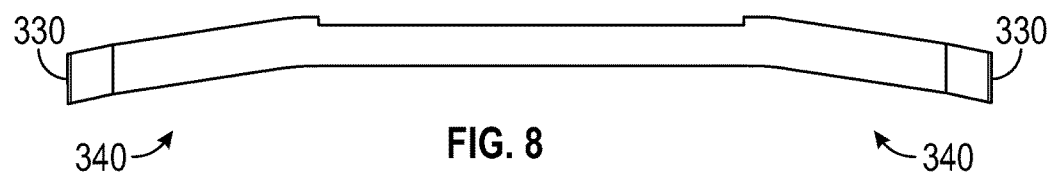
FIG. 8 illustrates a side view the spring tab shown in FIG. 8.
Figure 9:
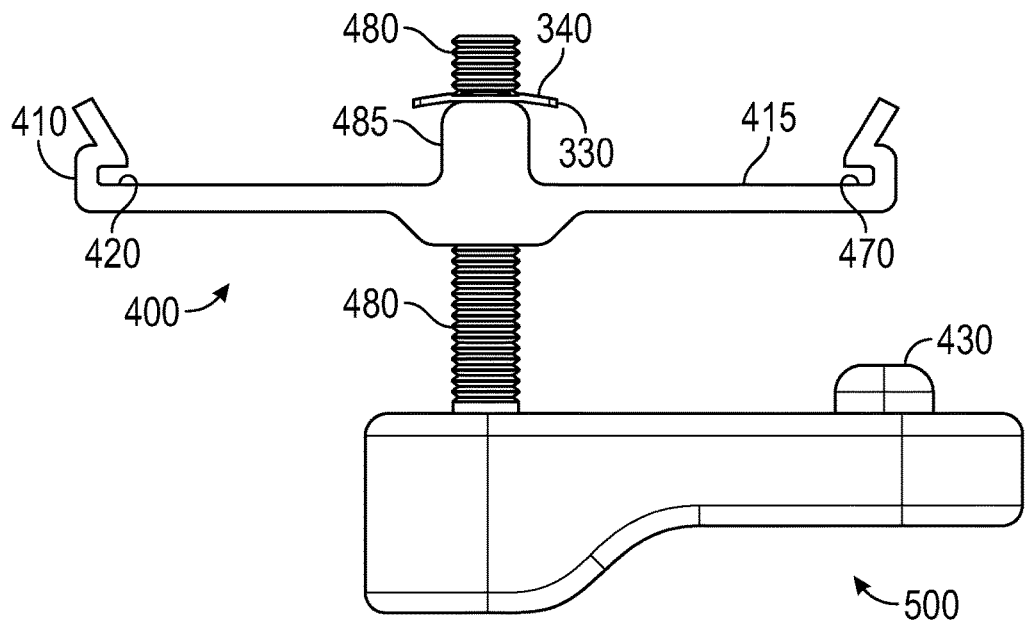
FIG. 9 illustrates a side view of the assembly shown in FIG. 6.
Figure 10:
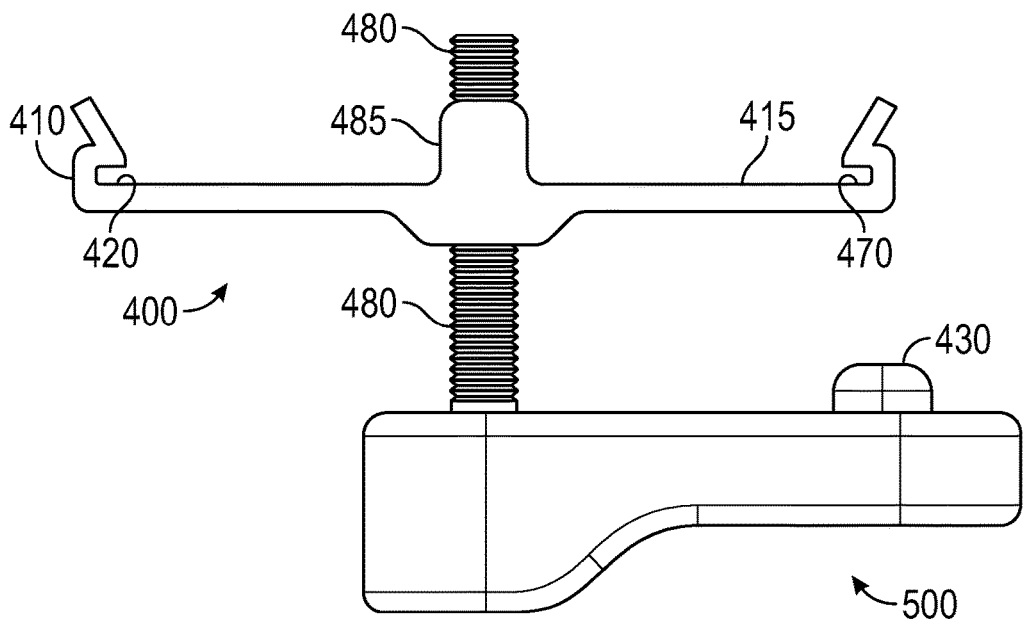
FIG. 10 illustrates a side view of the assembly shown in FIG. 5.

FIG. 6 shows the mounting plate 400 with elongated securing apparatuses such as spring tabs 340. The spring tabs 340 are typically secured to the central base 485 of the mounting plate 400 by a one or more bolts 487. As shown in FIGS. 7 and 8 the spring tabs 340 are elongated in shape having opposing sides 350 and 360. As used in the described embodiment for installing both an array skirt 200 and a module 600, a single spring tab 340 can be used by securing it to the central base 485 through the openings 355 so that opposing sides 350 and 360 of the spring tab 340 can be used to secure the skirt 200 and module 600 to the mounting plate 400. The opening 345 provides for the bolt 480 as will be described below that allows the height of the mounting plate 400 to be adjusted. The spring tab 340 is typically rigid, resilient, and made of conducting material. The sides 350 and 360 can be deflected up or down when secured to the central base 485, but the spring tab 340 should be resilient enough so it can provide enough recoil force after deflection to laterally move an array skirt 200 or module 600 and ultimately return to its open and horizontal position. Each side 350 and 360 of the spring tab 340 includes one or more raised portions 330. The raised portion 330 is used to penetrate the surface of the modules 600 so that an electrical grounding path can be provided from the modules 600 to the entire solar panel array 800. As shown in FIG. 6, the spring tab are substantially horizontal and parallel to the base area 415 when in the open position prior to the array skirts 200 and modules 600 respectively being lowered and then secured. As described throughout this section, the spring tab 340 is considered in the locked position when the spring tabs 340 have laterally moved the extension plates 210 and 610 of the array skirts 200 and modules 600 into the inlets 420 and 470 of the mounting plate 400 so that the raised portions 330 can penetrate the surface areas of the modules 600. When this occurs, the spring tabs 340 typically will be firmly pressed against the array skirts 200 and modules 600, but deflected at a slight angle downward. FIGS. 9 and 10 show side views of the mounting plate 400 connected to the pivot base 500. FIG. 9 shows the spring tabs 340 in the open position, while FIG. 10 shows the mounting plate 400 without spring tabs 340.

Figure 11:
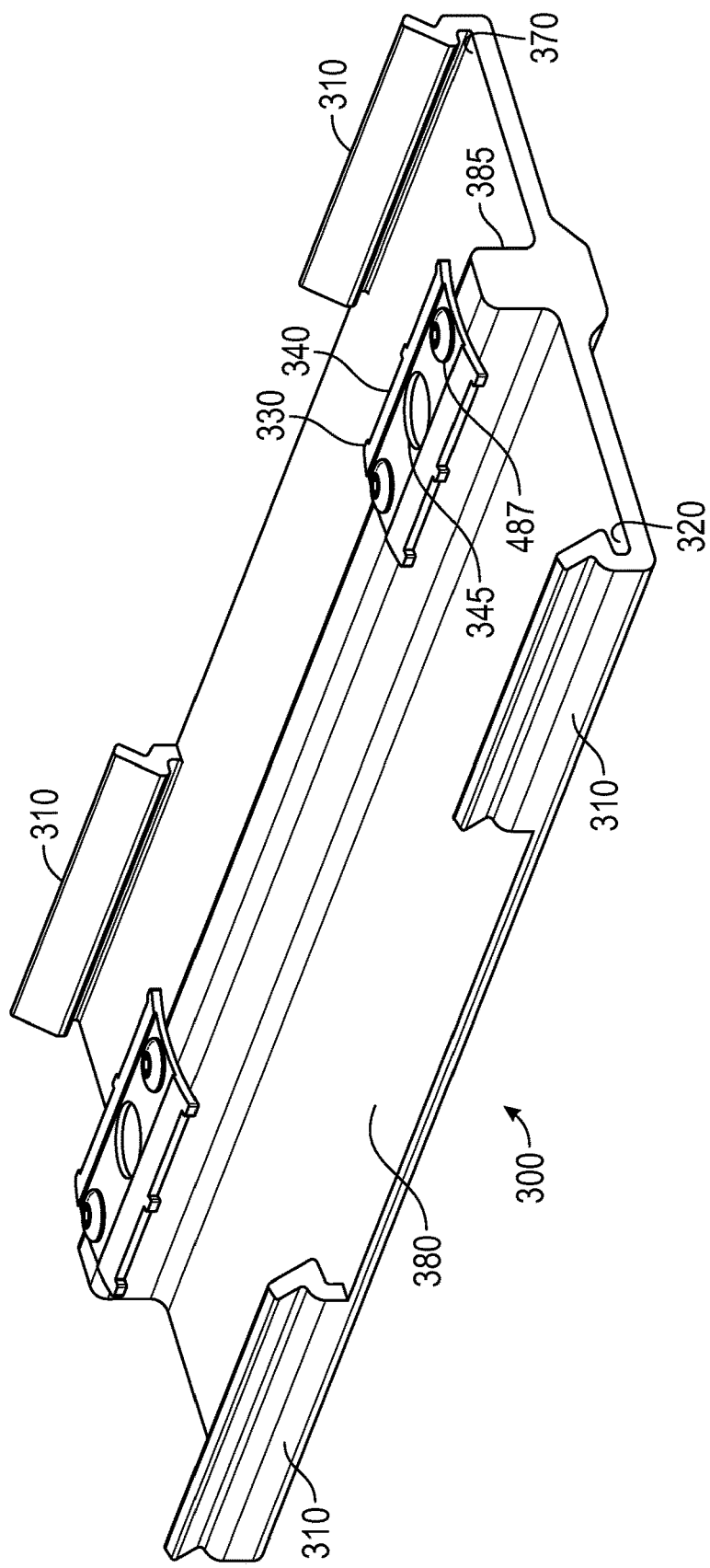
FIG. 11 illustrates a perspective view of an exemplary embodiment of a splice mount with multiple spring tabs.

FIG. 11 illustrates a splice mounting plate 300. The splice 300 is used to join multiple array skirts 200 or modules 600 and typically does not require support to a flashing. The splice 300 includes many of the same elements of the mounting plate 400 and comprises a base area 380, pair of opposing lips 310 opposite sides of the splice 300, and a pair of opposing inlets 320 and 370 on opposite sides of the splice 300. Like the mounting plate 400, the inlets are used to receive the extension plates 210 and 610 of the array skirts 200 and modules 600. Similarly, a pair of spring tabs 340 are secured to the splice 300 by way of bolt 487 on a central base 385. As with the mounting plate 400, the central base 385 is elevated above the base area 380. The spring tabs 340 include at least one raised portion 330 on the perimeter of the spring tabs 340. The spring tabs 340 are parallel to the base area 385 in the open position, which in combination with the elevated central base 385 allows the extension plates 210 and 610 of the array skirts 200 and modules 600 respectively to be lowered, inserted, and then secured. The central base area 385 does not have to be in the physical center of the splice 300 (or of any mounting plate 400), but it is preferable if the extension plates 220 and 620 are equal in size. The spring tabs 340 operate in basically the same manner on the splice 300 as they do on the mounting plate 400. The spring tabs 340 enable an installer to install the array skirts 200 and modules 600 by hand without the need for additional or complicated tools.

Figure 13:
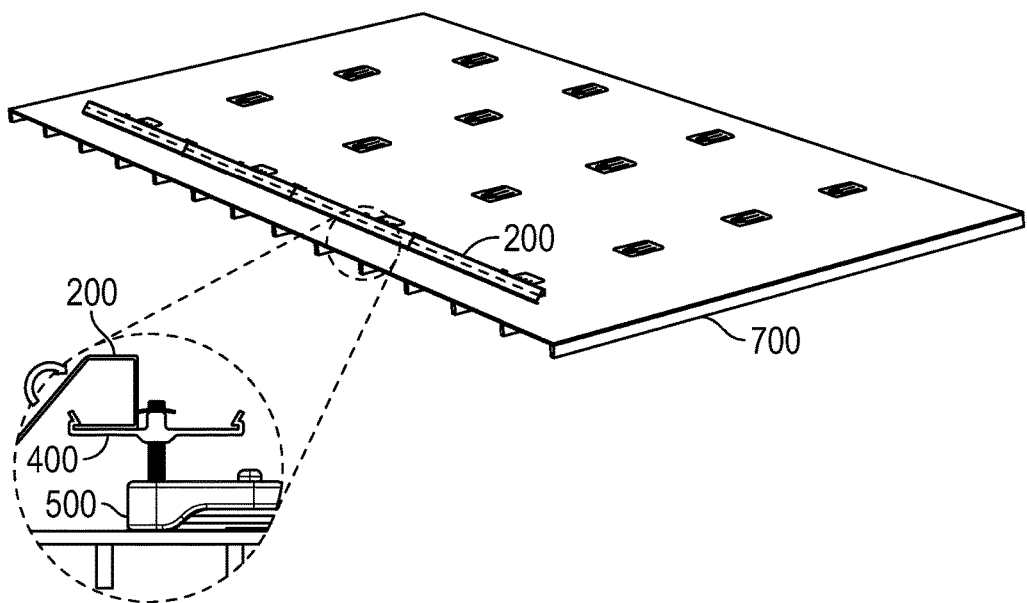
FIG. 13 illustrates the same assembly in FIG. 6 showing an exploded side view of an array skirt coupled to the mounting plate with the spring tab in the locked position.
Figure 15:
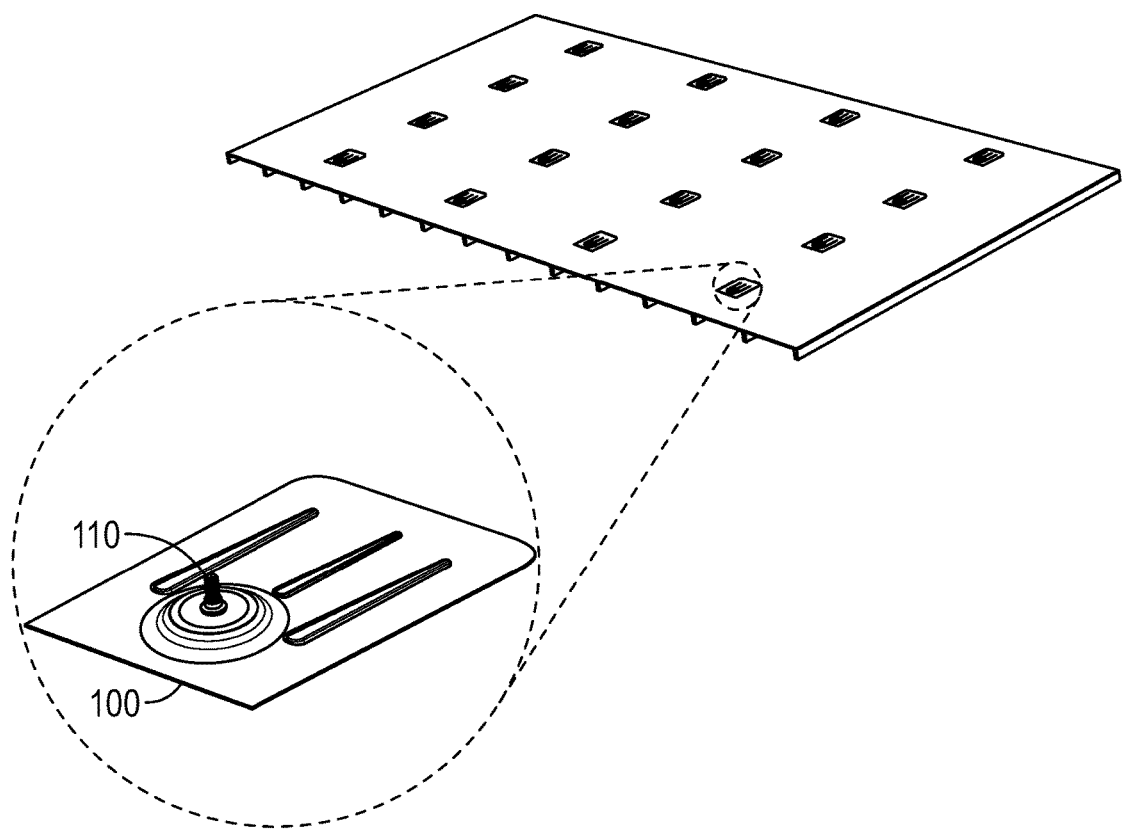
FIG. 15 illustrates a perspective view of an array of flashings on a roof and an exploded view of a single flashing.

Installation of the solar panel array 800 includes several steps as will now be described. FIGS. 12 and 13 show a typical roof 700. Generally, the first step is to install as many flashings 100 as needed to create the array 800 by securing the flashings 100 to the roof by way of the securing bolt 110 as shown in FIG. 15. As shown in the exploded view of FIG. 12, a mounting plate 400 is installed on each flashing 100. One end 430 of the pivot base 500 is rotatably coupled to the securing bolt 110 of the flashing 100. A mounting plate 400 is then installed to a pivot base 500 along bolt 480. The mounting plate 400 is rotated around the bolt 480 until the desired height of the mounting plate 400 is achieved. The exploded view in FIG. 12 shows the spring tabs 340 in the open position on the mounting plate 400 and are ready to receive either the array skirts 200 or modules 600. FIG. 13 shows a fully installed row of array skirts 200 with an exploded view of a single array skirt 200 being secured to the mounting plate 400.

Figure 16:
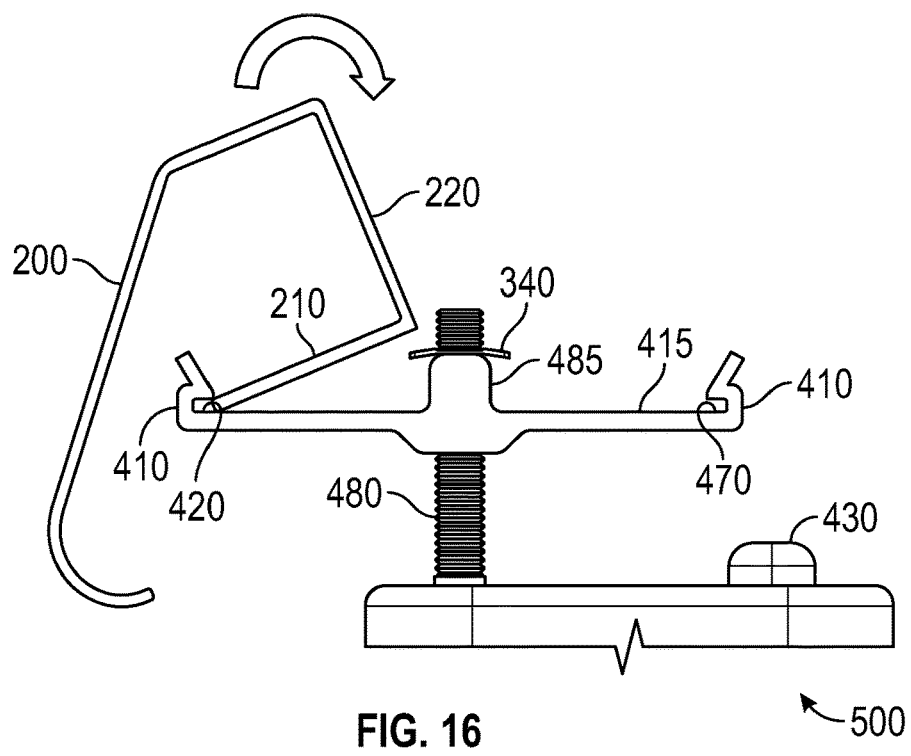
FIG. 16 illustrates a side view of an array skirt being lowered into a mounting plate.
Figure 17:
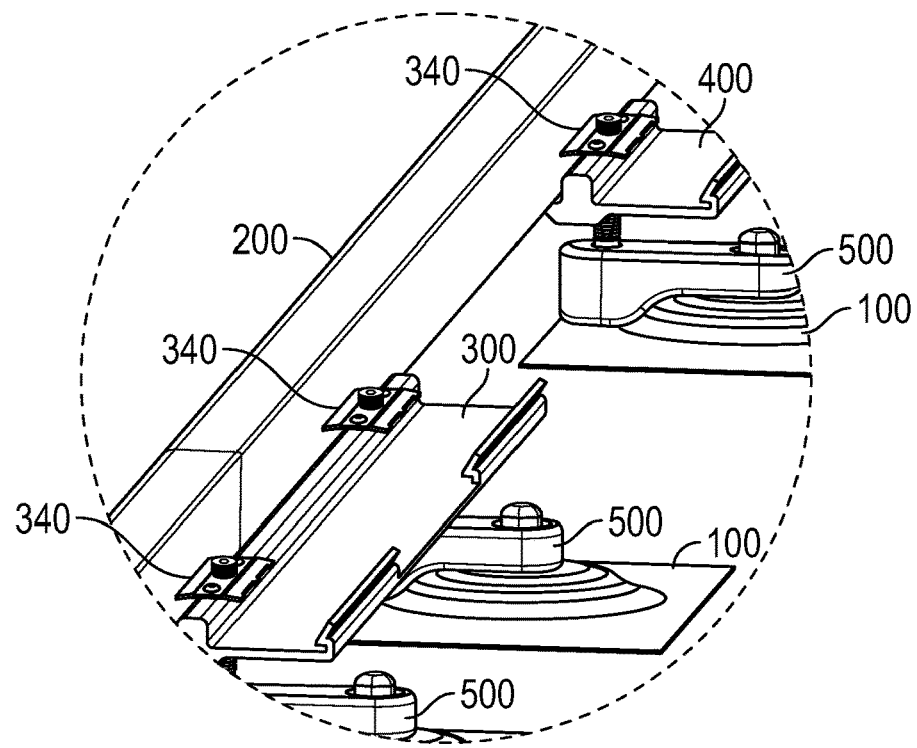
FIG. 17 illustrates a perspective view of series of array skirts secured to both a standard mounting plate and a splice.

FIGS. 16 and 17 show the first steps of installing a typical array skirt 200 to the mounting plate 400. As shown in the side view of the assembly of FIG. 16, the array skirt 200 is lowered into the first section 405 of the mounting plate 400 while the spring tabs 340 are in the open position. While in the spring tabs 340 are in the open position, the array skirt 200 can be lowered into place at an acute angle with respect to the base 415 of the mounting plate 400. FIG. 17 shows a wider view of multiple array skirts 200 installed to both a mounting plate 400 and a splice 300 with the spring tabs 340 in the locked position.

Figure 18:
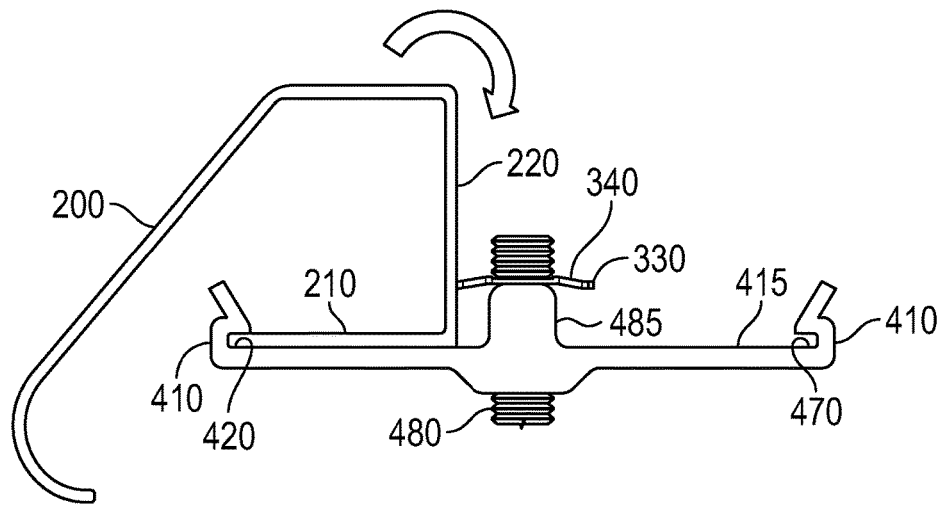
FIG. 18 illustrates a side view of a spring tab deflecting from an open to a locked position and laterally moving an array skirt into place.

FIG. 18 shows the array skirt 200 being secured to the mounting plate 400. As shown, as the array skirt 200 is lowered into place, it is typically accomplished by lowering the extension plate 210 at an acute angle with respect to the base 415 into the inlet 420 on the lip 410. The back side 220 of the array skirt 200 is then rotated downward so that it engages one side of the spring tab 340, which then deflects downward as the array skirt 200 is further rotated downward. As the spring tab is deflected, its resilience causes the extension plate 210 to be inserted even further into the inlet 420 and up against the lip 410. The deflected portion of the spring tab 340 becomes positioned substantially perpendicular to the side 220 of the array skirt 200 and continues to push outward causing the array skirt 200 to be securely positioned in the mounting plate. This process is repeated for each flashing 100 and where two array skirts 200 are joined together at a splice 300.

Figure 19:
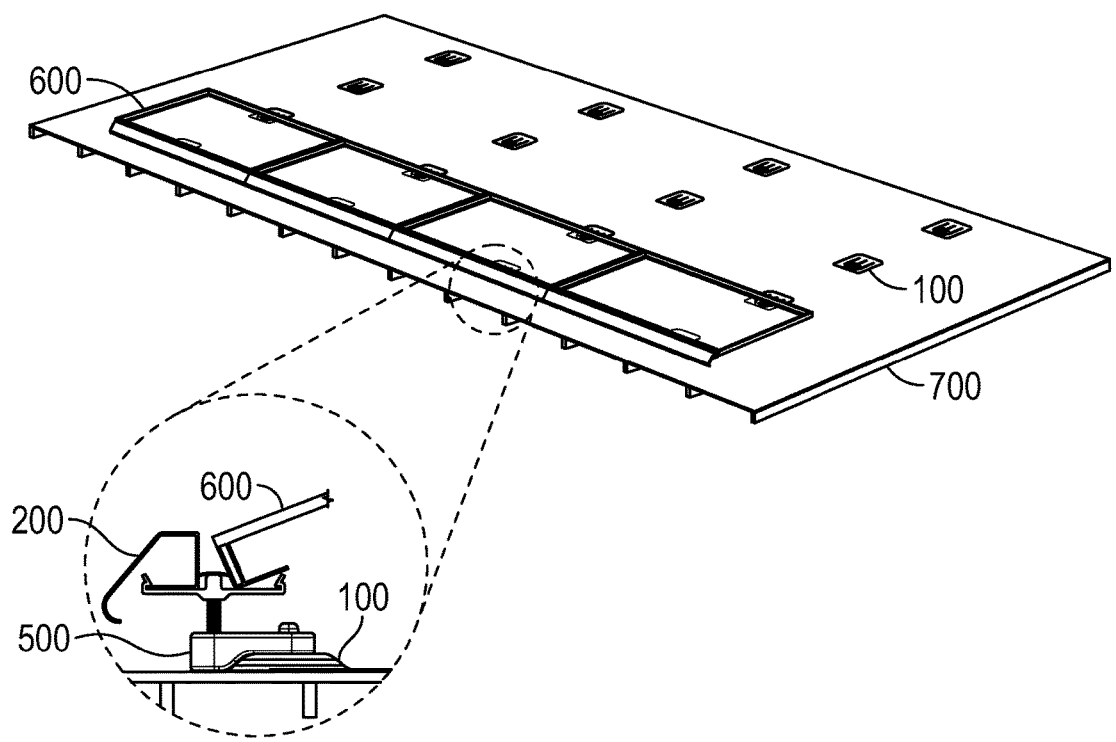
FIG. 19 illustrates a perspective view of a row of array skirts and solar panel modules fully assembled with an exploded side view of an array skirt and a solar panel secured to a mounting plate.

Once the array skirts 200 are installed to the mounting plates 400 and splices 300, FIG. 19 shows the next step, which is to install a solar panel module 600 to each mounting plate 400 and splice 300. The exploded view shows a side view of an array skirt 200 and module 600 installed on opposite sides of a mounting plate 400.

Figure 14:
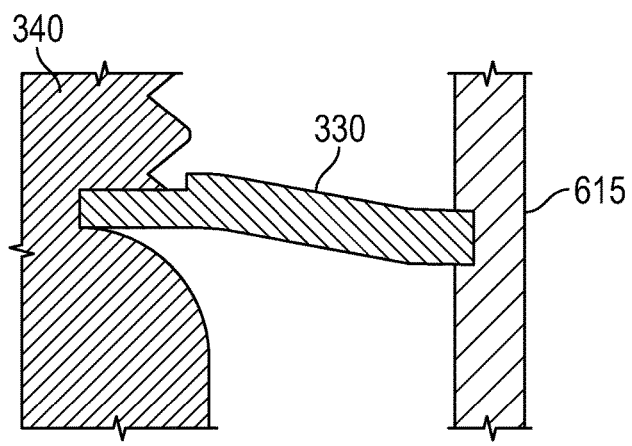
FIG. 14 illustrates a cross-sectional view of the raised portion of the spring tab shown penetrating a surface of the solar panel module.
Figure 20:
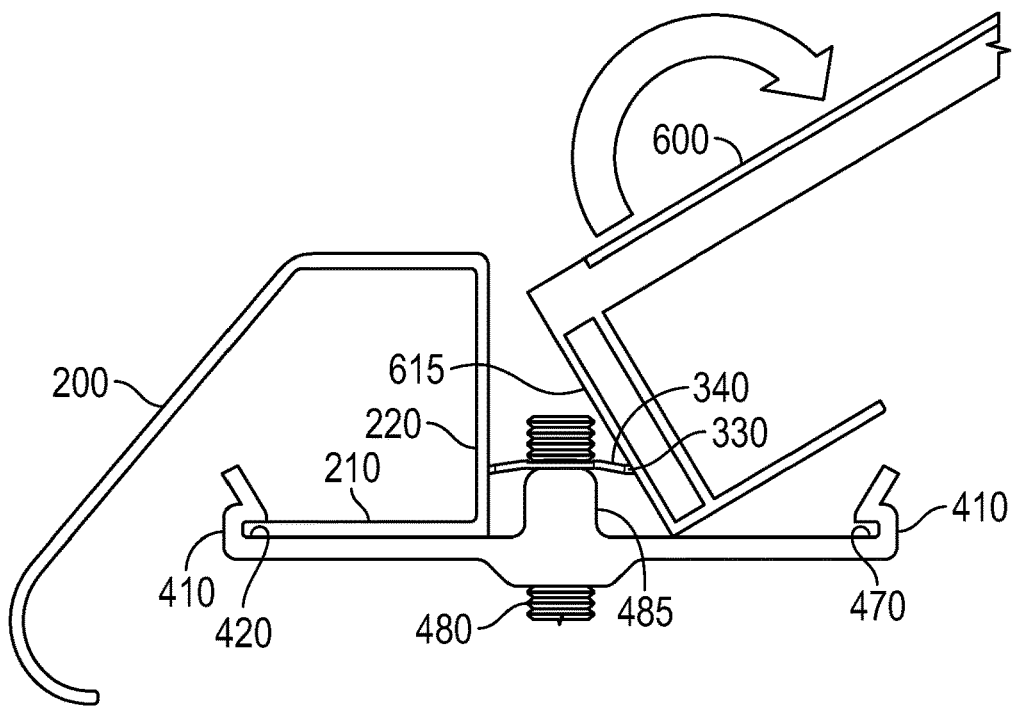
FIG. 20 illustrates a side view of an array skirt and a solar panel module being lowered onto a mounting plate with the spring tab in the locked position for the array skirt and the open position for the module.
Figure 21:
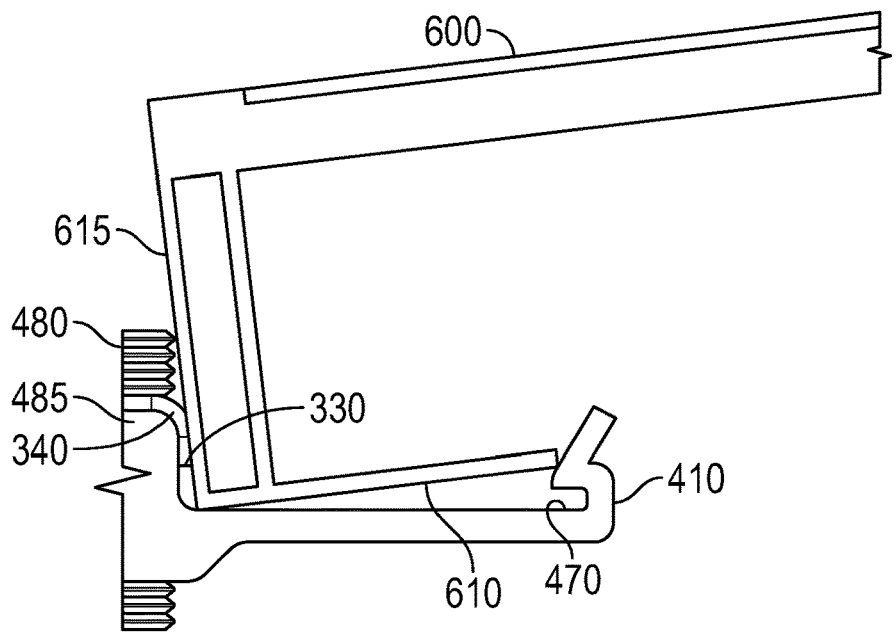
FIG. 21 illustrates a side view of the solar panel module in the assembly shown in FIG. 20 showing the spring tab being moved to a locked position for the solar panel module.
Figure 22:
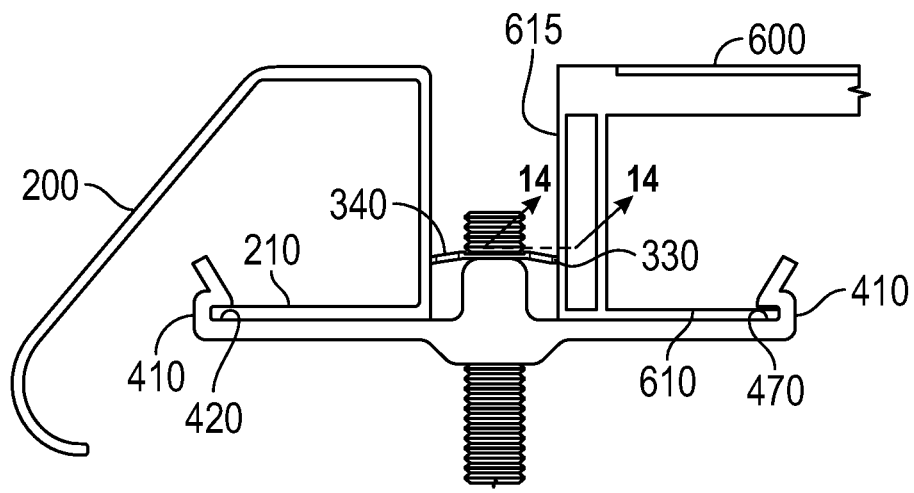
FIG. 22 illustrates a side view of the assembly shown in FIG. 20 with the array skirt and solar panel module and the spring tabs in a locked position.

FIGS. 20 and 21 show a module 600 being installed on a mounting plate 400. As shown, the mounting plate 600 is lowered on the second section 406, which is the opposite side of the array skirt 200 in the mounting plate 400. As with the array skirt 200, when the spring tabs 340 are in the open position, the module 600 can be lowered into place at an acute angle with respect to the base 415 of the mounting plate 400. Typically, the side 615 of the module 600 is first lowered and engages the spring tab 340 so that it applies a force to the tab 340 and deflects it downward. The module 600 is then rotated downward as shown so that the extension plate 610 can engage the lip 410 and snap below the lip 410 so that the extension plate 610 rests on the base 415. The resiliency of the spring tab 340 than causes it to push the side 615 laterally outward so that the end of the extension plate 610 is inserted into, and becomes secured within the inlet 470. At the same time, the raised portions 330 engage the side 615 and penetrate the surface of the module 600 so that it creates an electrical contact between the module 600 and the spring tab 340. By doing so, the connection provides an electrical grounding path between the solar panel module 600 and the rest of the solar panel array 800. At this point, the spring tab 340 is in the locked position. FIG. 22 shows a side view of a completed installation of an array skirt 200 and a module 600 to a mounting plate 400 with the spring tabs 340 in the locked position. FIG. 14 shows a cross-sectional view of the raised portion 330 penetrating the outer layer of the side 615 when the spring tab 340 is in the locked position.

Figure 23:
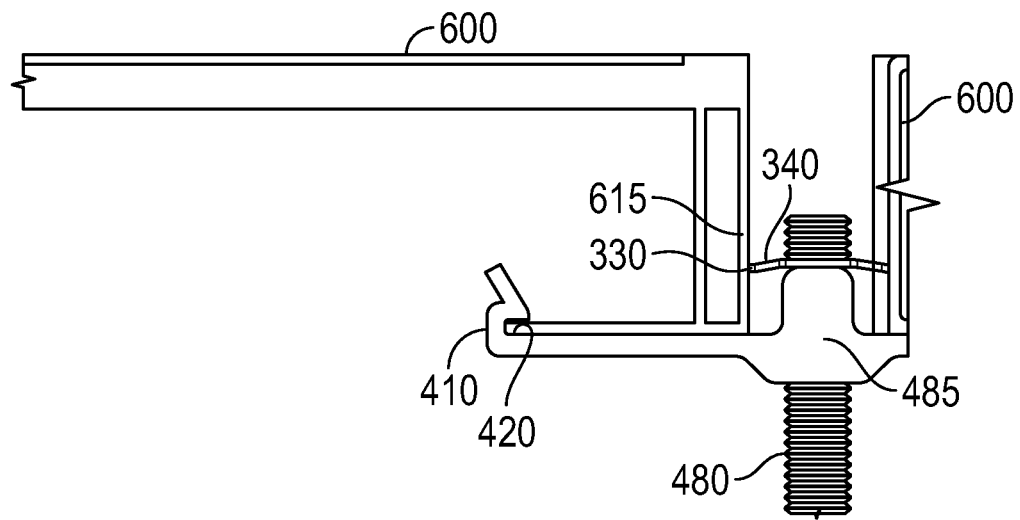
FIG. 23 illustrates a side view of the opposite side of the solar panel module array in FIG. 19 showing the solar panel module and spring tab in the locked position in the mounting plate.
Figure 24:
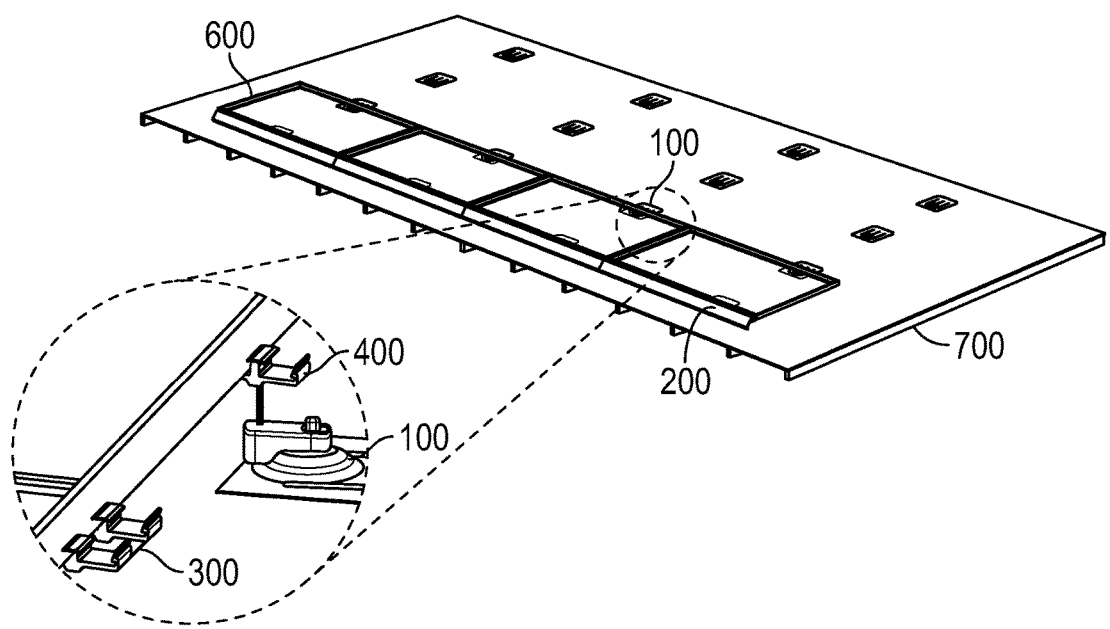
FIG. 24 illustrates the same view in FIG. 19 showing an exploded perspective view of the solar panel modules secured to a splice and a standard mounting plate.

The next step is to install the opposite side of the solar panel modules 600. FIG. 23 shows the completed step. The illustration shows the spring tab 340 in the locked position after the module 600 was lowered into the mounting plate 400 and secured the mounting plate 400 after the spring tab 340 was placed in the locked position and providing a grounding path from the module 600 to the rest of the array 800. FIG. 24 shows a full row of the array skirts 200 and modules 600 having been installed in the first row of the array 800 and secured to both mounting plates 600 and flashings 100 as well as splices 300. After the first row is installed, each subsequent row is installed by repeating the process described above.

What is claimed is:

1. A mounting assembly for installing a solar panel array to a roof comprising:
   a. a mounting plate for receiving a solar panel module;
   b. a tab comprising a resilient material for affixing the solar panel module to the mounting plate;
   c. the mounting plate further comprising
      i. an elevated base;
      ii. a first section extending from a first side the elevated base and further comprising a first end; and
      iii. a second section extending from a second side of the elevated base and further comprising a second end;
   d. the tab coupled to the elevated base further comprising:
      i. a first and a second side each extending outwardly on opposite sides of the elevated base such that the first side deflects upward or downward from a default position when a force is exerted on the first side of the tab;
      ii. a raised portion on the first side for penetrating a surface layer on the solar panel module.

2. The mounting assembly of claim 1 wherein the first end of the mounting plate comprises a lip for receiving an edge of the solar panel module within the lip.

3. The mounting assembly of claim 1 such that the first side of the tab is deflected by a solar panel module, the first side of the tab produces a sufficient force to laterally move the solar panel module along the mounting plate into a locked position.

4. The mounting assembly of claim 3 such that the raised portion of the tab penetrates the surface layer of the solar panel module when the solar panel module is in the locked position.

5. The mounting assembly of claim 1 wherein the mounting plate is rotatably coupled to a pivot base.

6. The mounting assembly of claim 1 wherein the mounting plate is a splice for securing a plurality of adjacent solar panel modules by utilizing a plurality of tabs wherein the tabs are coupled to the elevated base of the mounting plate.

7. The mounting assembly of claim 1 wherein the tab is further comprised of an electrically conducting material.

8. A method of securing and grounding a solar panel module to a mounting plate comprising the steps of:
   a. lowering a side portion of a solar panel module against a raised portion on a first side of a tab such that the tab is coupled to an elevated base of the mounting plate;
   b. deflecting the first side of the tab from a substantially horizontal position to a deflected position;
   c. rotating an end of the solar panel module downward so that the end of the solar panel module is inserted into an end of the mounting plate;
   d. releasing the first side of the tab so that the first side of the tab exerts an outward force that laterally moves the end of the solar panel into a locked position; and
   e. penetrating an outer surface layer of the solar panel module with the raised portion of the tab when the tab is in the locked position.

9. The method of claim 8 further comprising the step of inserting the end of the solar panel into a lip at the end of the mounting plate.

10. The method of claim 8 further comprising the step of coupling the mounting plate to a pivot base.

11. The method of claim 10 further comprising the step of coupling the pivot base to a flashing.

12. The method of claim 11 further comprising the step of coupling the flashing to a roof.

13. A mounting assembly for installing a solar panel array to a roof comprising:
   a. a mounting plate for receiving a solar panel module;
   b. a tab comprising a resilient material for affixing the solar panel module to the mounting plate;
   c. the mounting plate further comprising
      i. an elevated base and;
      ii. a first section extending from the elevated base and further comprising an end;
   d. the tab further comprising:
      i. a first and a second side that deflects from a default position when a force is exerted on the first side of the tab such that when the first side of the tab is deflected by a solar panel module, the first side of the tab exerts a sufficient force to laterally move the solar panel module along the mounting plate into a locked position;
      ii. the first side further comprising a raised portion for penetrating a surface layer on the solar panel module such that the raised portion of the tab penetrates the surface layer of the solar panel module when the solar panel module is in the locked position; and
      iii. the second side of the tab is coupled to the elevated base.

14. The mounting assembly of claim 13 wherein the end of the mounting plate is a lip for receiving an edge of the solar panel module within the lip.

15. The mounting assembly of claim 13 wherein the mounting plate is rotatably coupled to a pivot base.

16. The mounting assembly of claim 13 wherein the mounting plate is a splice for securing a plurality of adjacent solar panel modules by utilizing a plurality of tabs wherein the second sides of the tabs are coupled to the elevated base of the mounting plate.

17. The mounting assembly of claim 13 wherein the tab is further comprised of an electrically conducting material.

18. The mounting assembly of claim 13 wherein the mounting plate further comprises a second section extending outward from the elevated base on a side opposite the first section wherein the second section further comprises an end.

19. The mounting assembly of claim 18 wherein the second side of the tab extends outward from the elevated base in the same direction as the second section.

20. The mounting assembly of claim 19 wherein the second side of the tab further comprises a raised portion for penetrating a layer on an array skirt.

21. The mounting assembly of claim 18 wherein the end of the second section of the mounting plate is a lip for receiving an edge of the array skirt within the lip.

* * * * *